United States Patent [19]
Grueber et al.

[11] 3,753,541
[45] Aug. 21, 1973

[54] CARGO ROLLER ASSEMBLY

[75] Inventors: Randall A. Grueber, Los Altamitos; Robert A. Warren, Long Beach, both of Calif.

[73] Assignee: McDonnell Douglas Corporation, Santa Monica, Calif.

[22] Filed: Sept. 2, 1971

[21] Appl. No.: 177,361

[52] U.S. Cl. ......... 244/137 R, 193/37, 29/148.4 D, 29/116 AD, 29/129.5
[51] Int. Cl. ............................................. B64d 9/00
[58] Field of Search ............... 244/137; 193/37, 193/35; 198/127 R; 29/148.4 D, 110, 116 R, 116 AD, 129.5

[56] References Cited
UNITED STATES PATENTS

| | | |
|---|---|---|
| 1,286,343 | 12/1918 | Kendall .............................. 193/37 |
| 3,416,638 | 12/1968 | Buck ................................. 193/37 |
| 3,363,735 | 1/1968 | Hotchkiss .......................... 193/37 |
| 2,248,657 | 7/1941 | Blondon et al. ................ 198/127 R |
| 3,381,921 | 5/1968 | McDonough et al. ............. 244/137 |
| 2,757,988 | 8/1956 | Lecourbe ........................... 193/37 |
| 2,263,440 | 11/1941 | Hansen ........................ 29/148.4 D |

*Primary Examiner*—Milton Buchler
*Assistant Examiner*—Galen L. Barefoot
*Attorney*—Walter J. Jason, George W. Finch et al.

[57] ABSTRACT

A roller assembly for use when a high strength to weight ratio is required. The assembly includes a roller shell with internal stiffening ribs and a crown of a predetermined curvature. The shell is swaged over hubs at each end thereof, the hubs including low friction bearings for connection to a roller shaft.

7 Claims, 6 Drawing Figures

Patented Aug. 21, 1973  3,753,541

CARGO ROLLER ASSEMBLY

BACKGROUND OF THE INVENTION

The present roller assembly has been designed to fulfill a need for a roller assembly which will give a long and trouble-free service life primarily in the cargo compartments of aircraft. The cargo roller assemblies heretofore available have either had a relatively short service life or have been too heavy for efficient use in aircraft. The prior art cargo roller assemblies that have been light enough to satisfy aircraft design requirements have been unable to withstand and absorb unavoidable loads and shocks applied to the cargo rollers in an aircraft. An example of the unavoidable shock loads are the tangential shock loads imparted to such cargo rollers by the leading edges of aircraft cargo pallets and containers as they are being moved through the aircraft. The leading edges of the pallets or containers strike the rollers because aircraft pallets and containers are usually flexible which allows deflections of the edges. They also strike the rollers because the contacting surfaces of the rollers are usually not coplaner as is desirable, it being almost impossible to install roller assemblies on the deflectable floor of an aircraft so that all contacting surfaces of the rollers remain coplaner. The non-coplaner contacting surfaces of the rollers, the deflections of the pallets or containers when supporting various loads, and the deflections of the aircraft floor also continuously change the preferable parallel relationship between the rollers and the bases of the pallets or containers so that it is rare that the roller assemlies are ever uniformly loaded. The end result is that some rollers are required to carry much more load than others. In addition, most of the existing cargo rollers being utilized in today's aircraft conveyor systems have a constant outside diameter with only small radii or conical tapers at the ends. When misalignment occurs between the pallet or container base and the roller surface, a point contact is created which generates high localized stresses. When the load is transferred directly between the shell of the roller and its hub, high compressive stresses are generated which tend to cold roll the shell to a thinner cross-section which increases the diameter adjacent the hubs. There are instances on record where the repeated direct line contact loading of the area of the shell around the hub for as few as a hundred pallet movement cycles was sufficient to cause the roller shell to release the hub and thereby fail.

SUMMARY OF THE INVENTION

The present cargo roller assembly includes a roller having a roller shell with a crown of predetermined curvature to distribute the load placed thereupon away from hubs supporting the ends of the shell and toward the center so that the load is never sufficient to cause the shell to fail in compression adjacent the hubs. The shell is constructed from hard, strong, and light materials such as aluminum or titanium alloys and internal stiffening ribs are included within the interior of the shell to further improve its strength to weight ratio. The ribs run parallel to the center line of the shell and act as stiffening beams to transfer the shell loading toward the hubs. The number and size of the stiffeners can be varied to be compatible with the load to be supported by the roller. The ribs also form back-up landings for the hubs which are usually swaged in each end of the shell. The hubs preferably include self-aligning, low friction bearings such as precision ball bearings to assure a long service life of the roller assembly. The low friction bearings in combination with a relatively hard outer shell surface also reduces the starting and rolling friction between the pallets or containers and the roller assemblies so that relatively little energy is required when it is desired to move the pallets or containers over a level aircraft floor.

The bearings attach the roller to support means such as a shaft and aircraft structure. It is preferable that the support means for the rollers are relatively identical so that all rollers tend to be deflected a similar amount under similar load conditions. This causes the rollers to take up relatively equal amounts of the load applied thereto by the pallet or container assemblies as they are moved back and forth thereover.

It is therefore an object of the present invention to provide a cargo roller assembly having a high strength to weight ratio.

Another object is to provide internal stiffeners to allow the shell of the roller to be capable of working to a higher stress level.

Another object is to provide a crown roller surface which has a uniform bearing stress allowable between roller and the surface of the container/pallet base providing the included angle of the crown is not exceeded.

Another object is to provide a cargo roller assembly which can distribute misaligned loads so high localized stress conditions can never exist to destroy the roller.

Another object is to provide a cargo roller assembly over which cargo pallets and/or containers can be moved and retained which absorbs the load of the pallet or container assembly relatively uniformly thereacross.

Another object is to provide a roller assembly having low start up and rolling friction.

Another object is to provide a cargo roller assembly which is relatively easy and economical to manufacture.

These and other objects and advantages of the present invention will become appparent after considering the following detailed specification which covers an embodiment thereof in conjunction with the accompanying drawings wherein:

DESCRIPTION OF THE PRESENT EMBODIMENTS

Figure 1:
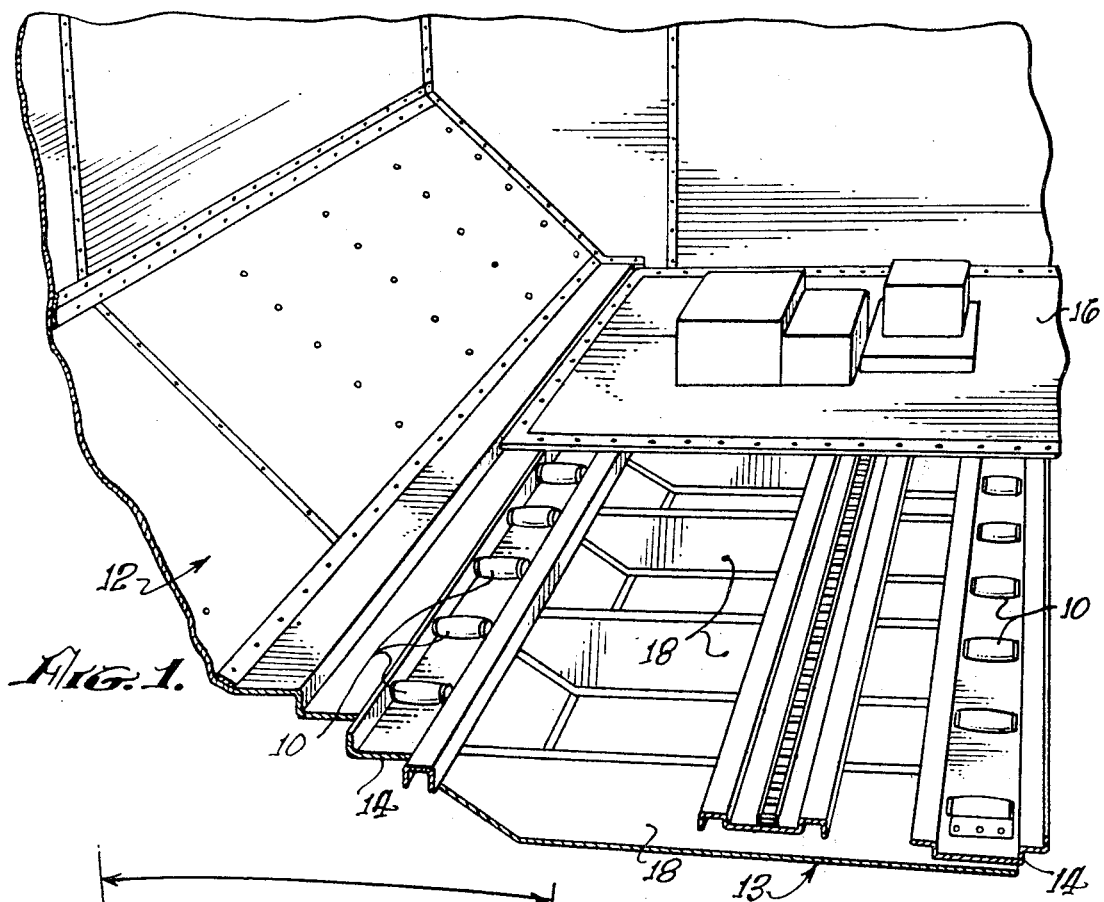
FIG. 1 is a partial perspective view of the cargo compartment of an aircraft including cargo roller assemblies which are constructed according to the present invention.

Referring to the drawings more particularly by reference numbers, number 10 in FIG. 1 refers to cargo rollers installed in the cargo compartment 12 of an aircraft structure 13. The rollers 10 are installed in channel members 14 in the floor of the compartment 12 in position to support and enable movement of cargo carrying means such as a pallet 16 thereover. The rollers 10 are evenly distributed along each channel 14 in an equally spaced relationship to the stiffening floor beams 18 of the aircraft structure 13. This even distribution of the rollers 10 with respect to the stiffening beams 18 of the structure 13 causes them each to have approximately the same resilient mounting structure so that when the pallet 16 is moved thereacross or maintained thereover, the rollers 10 tend to take relatively equal portions of the load.

Figure 2:
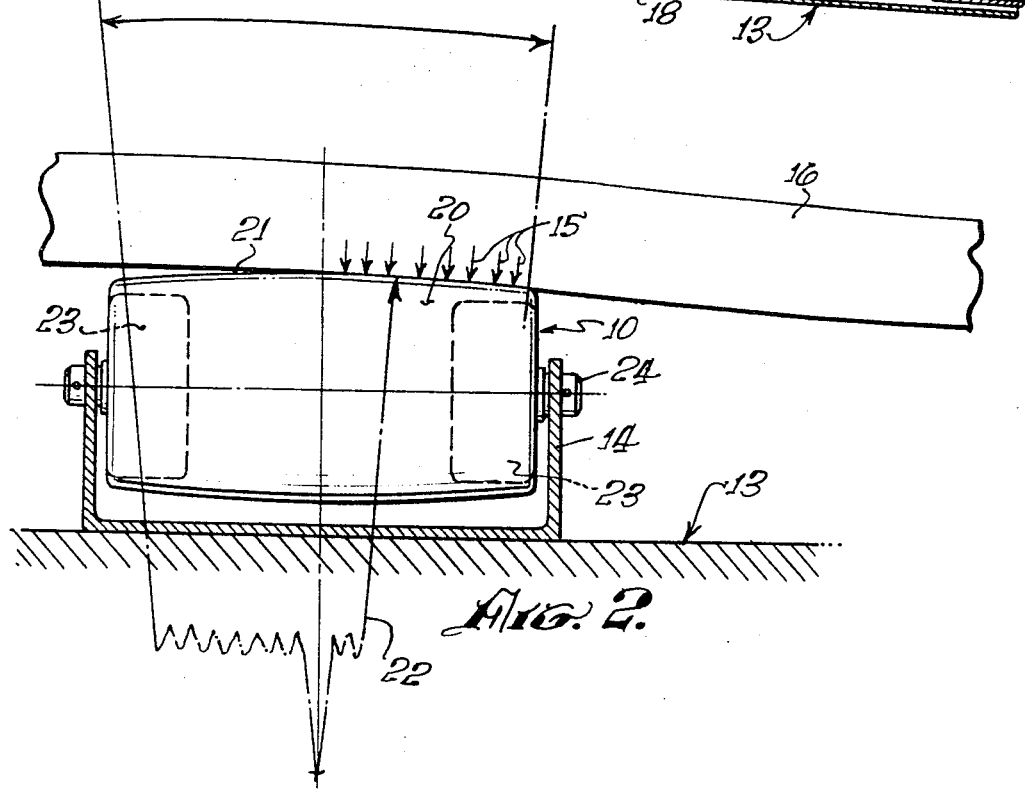
FIG. 2 is an elevational view of a cargo roller assembly constructed according to the present invention showing the "worst case" relationship thereof to a relatively flexible loading member such as a pallet assembly.

The manner in which the rollers 10 handle the load, indicated by arrows 15, from a relatively flexible member such as the pallet 16 is shown in FIG. 2. The roller 10 includes a roller shell 20 with a crowned outer surface 21 curved in a predetermined radius 22. The radius 22 is specifically chosen to be large enough to assure a load distribution across the shell 20 as shown by the arrows 15 yet small enough that the flexibility of the pallet 16 is transferred from the roller 10 through a roller shaft 24 and the channel member 14 to the aircraft structure 13 which may have a slight amount of give as aforesaid.

One method to easily and economically construct the roller shell 20 is to impact extrude a slug member 26 (FIG. 3) out of suitable material. The impact extrusion causes a grain orientation as shown by the arrows 28 which is desirable to improve the strength characteristics thereof in materials which are grain orientation sensitive. As shown in FIG. 4, the slug 26 is formed with integral stiffening ribs 30 evenly spaced, such as at 45°, about the inner circumferential surface 32 thereof. The ribs 30 increase the strength of the shell 20 without adding much weight and thereby improve the strength to weight ratio of the finished roller 10.

Figure 3:
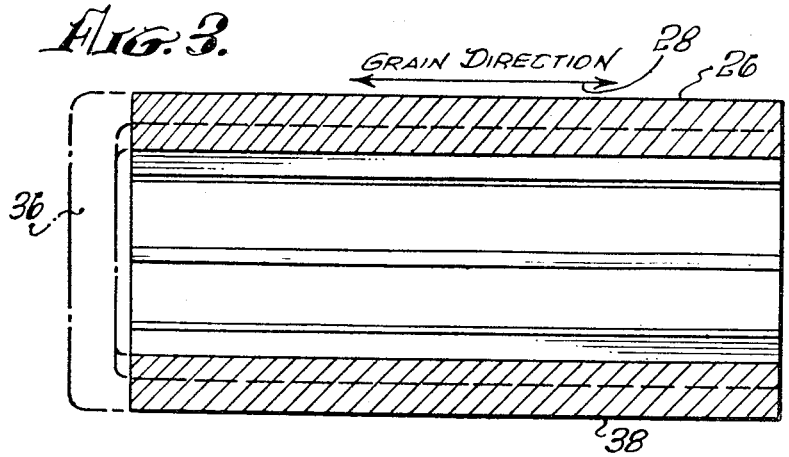
FIG. 3 is a cross-sectional view of a slug from which the shell for a roller, as shown in FIG. 2, can be constructed.
Figure 4:
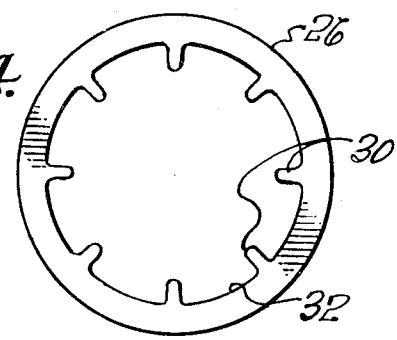
FIG. 4 is an end view of the slug of FIG. 3.

In constructing a finished roller 10 from the slug 26, the closed end 36 of the slug 26 is removed as shown in FIG. 3. The outer cylindrical surface 38 is then formed by any suitable means such as machining to the crowned outer circumferential surface 21 having the radius 22 as determined from the flexibility of the pallets 16 to be used and the structure 13 in which the roller 10 is to be mounted.

Figure 5:
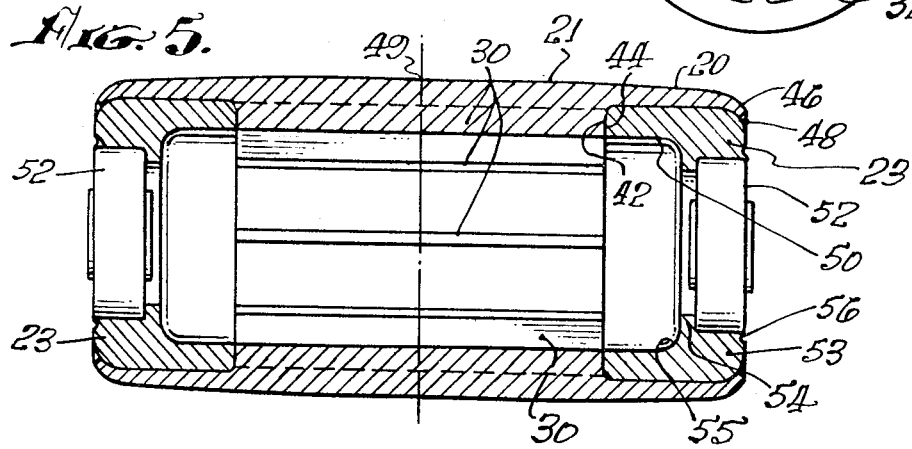
FIG. 5 is a cross-sectional view of a completed cargo roller constructed according to the present invention.

The ends of the slug 26 are then bored out to remove portions of the ribs 30 so the hubs 23 can be placed within the slug 26. As can be seen in FIG. 5, the hubs 23 each include an abutment surface 42 which mates with landings 44 formed when the ends of the stiffening ribs 30 are removed. Once the hubs 23 are installed within the shell 20, the end portions 46 of the shell 20 are smoothly swaged down over a suitably curved surface 48 formed on the front portion of the hubs 23 to lock the hubs 23 within the shell 20. The swaging is done with care so the curvatures of the end portions 46 of the shell 20 do not extend above the predetermined radius 22 of the outer circumferential surface 21 of the shell 20 since otherwise high localized stress areas could develop in the areas of the hubs 23.

It should be noted that the cross-section of the shell 20 in the area of the hubs 23 is slightly tapered by the curvature of the outer circumferential surface 21 thereof. This is desirable since it causes a relatively even transfer of the load from the crown 49 of the shell 20 to the hubs 23. It should be obvious that although present manufacturing economies seem to make the above roller assembly construction method attractive, the shell 20 can be formed by many other methods including but not limiting to casting or machining and broaching from tubing. It should also be noted that the hub 23 is no thicker at the back portion 50 thereof than the ribs 30 since an increased hub thickness at this portion 50 would result in increased material weight without contributing substantially to the overall strength of the roller 10. The thin portion 50 also creates a slight flexibility of the hub 23 to improve the shell to hub loading characteristics.

Figure 6:
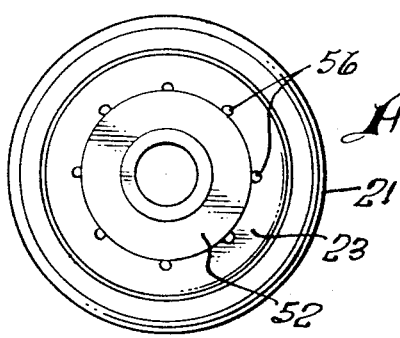
FIG. 6 is an end view of the roller of FIG. 5.

The hubs 23 usually include antifriction menas such as the ball bearings 52 shown. It is preferable that ball bearings of the self-aligning type be used since the structure 13 and the shaft 24 which support the roller 10 may deflect slightly causing a slight misalignment of the bearings 52 and otherwise generate overloading stress. As can be seen, each roller hub 23 is slightly thicker at the portion 53 thereof adjacent the bearing 52 as relatively high loads must be transferred from the hub 23 to the bearing 52. The hub 23 includes an inner flange 54 which allows the bearing 52 to be easily positioned and secured within the hub 23. A smooth curved surface 55 is provided between the back portion 50 and the flange 54 to eliminate any stress concentration which might otherwise operate to crack the hub 23. As can be seen in FIG. 6, a convenient method of retaining the bearings 52 within the hubs 23 is to stake the bearings 52 to the hubs 23 at evenly spaced locations 56 thereabout.

Thus there has been shown and described a novel cargo roller assembly which fulfills all of the objects and advantages sought therefor. Many changes, alterations, modifications and other uses and applications of the subject cargo roller assembly will become apparent to those skilled in the art after considering this specification and the accompanying drawings. All such changes, modifications, alterations and other uses and applications which do not depart from the spirit and scope of the invention are deemed to be covered by the invention which is limited only by the claims which follow.

What is claimed is:

1. A cargo roller assembly for use in aircraft where a high strength to weight ratio is desirable, said assembly including a first roller having:

a generally cylindrical roller shell having opposite end portions, an outer curved surface having a predetermined longitudinal cross-sectional radius, said radius being large in comparison to the circumferences of said roller, an inner cylindrical surface, and longitudinal integral stiffening ribs extending from said inner cylindrical surface at equally spaced locations thereabout, said ribs being centrally located within said shell and having shaped end portions within said shell; and a pair of hub members positioned in said shell, each of said hub members having an outer cylindrical surface which mates with said inner cylindrical surface of said shell, a curved back side surface adapted to abut said shaped end portions of said ribs, an outer side surface, an outer curved surface between said outer cylindrical surface and said outer side surface and means to support bearing means centraly therein, said shell end portions being deformed over said hub outer curved surfaces to retain said hub members in said shell.

2. The assembly defined in claim 1 wherein said hub members each include:
a back ring portion on which said curved back side surface is formed, said back ring portion having a thickness about the same distance as the height of said ribs.

3. The assembly defined in claim 2 wherein said hub members each include:
an internal flange smoothly formed by a concave curved surface which extends inwardly from said back ring portion;
a front inner cylindrical surface; and
anti-friction bearing means, said bearing means being positioned in abutment with said internal flange and said front inner cylindrical surface.

4. The assembly defined in claim 3 wherein said anti-friction bearing means include:
self-aligning ball bearings which are staked to said hubs to retain said bearings to said hub members.

5. The assembly defined in claim 1 including:
support means for retaining said shell in a predetermined relationship to the aircraft, said support means including bearings fixedly retained in each of said hub members, a shaft extending through and supporting said bearings, and a structure connected to the aircraft supporting said shaft, said structure and shaft having predetermined deformation characteristics under load so that a plurality of said rollers will deflect the same amount under the same load.

6. The assembly defined in claim 5 including at least two other rollers essentially identical to said first roller mounted in said support means so that said shells thereof define a line which cargo can be expected to move along, whereby said predetermined deformation characteristics of said support structure assure said rollers are loaded generally equally.

7. The assembly defined in claim 1 wherein said roller shell is constructed from aluminum alloy sensitive to the orientation of the metal grains therein.

* * * * *

PO-1050
(5/69)

UNITED STATES PATENT OFFICE
CERTIFICATE OF CORRECTION

Patent No. 3,753,541                Dated 21 August 1973

Inventor(s) R. A. Grueber et al

It is certified that error appears in the above-identified patent and that said Letters Patent are hereby corrected as shown below:

Column 3, lines 2 through 5 should be deleted in their entirety.
Column 3, line 31, after "16" should continue --or other cargo carrying device is never sufficient to cause high localized stresses to occur at the ends thereof where the hubs 23 are located. The load from the pallet 16--.
Column 4, line 12, the word "limiting" should be --limited--.
Column 4, line 21, the word "menas" should be --means--.

Signed and sealed this 20th day of August 1974.

(SEAL)
Attest:
McCOY M. GIBSON, JR.
Attesting Officer

C. MARSHALL DANN
Commissioner of Patents